United States Patent
Nelson et al.

(10) Patent No.: US 8,003,147 B1
(45) Date of Patent: Aug. 23, 2011

(54) METHOD FOR MAKING DRIED WHEY PROTEIN PRODUCT

(75) Inventors: Robert A. Nelson, Sugar Grove, IL (US); Robert M. Sobel, Elburn, IL (US)

(73) Assignee: FONA Technologies, Inc., Geneva, IL (US)

( * ) Notice: Subject to any disclaimer, the term of this patent is extended or adjusted under 35 U.S.C. 154(b) by 1432 days.

(21) Appl. No.: 11/377,621

(22) Filed: Mar. 16, 2006

Related U.S. Application Data

(63) Continuation-in-part of application No. 11/090,973, filed on Mar. 25, 2005, now abandoned.

(51) Int. Cl.
*A23C 17/00* (2006.01)

(52) U.S. Cl. ........ 426/471; 426/593; 426/656; 426/317; 426/491; 426/474

(58) Field of Classification Search ............ 426/656, 426/317, 491, 471, 474
See application file for complete search history.

(56) References Cited

U.S. PATENT DOCUMENTS

| | | | | |
|---|---|---|---|---|
| 2,835,597 | A | * | 5/1958 | Barzelay ............... 426/471 |
| 2,887,390 | A | * | 5/1959 | Coulter et al. ............ 426/588 |
| 3,066,133 | A | * | 11/1962 | Pinckney ............... 530/361 |
| 3,185,580 | A | | 5/1965 | Hanrahan et al. |
| 3,547,179 | A | * | 12/1970 | Hussmann ............... 159/4.04 |
| 3,620,776 | A | * | 11/1971 | Mishkin et al. ............ 34/288 |
| 3,628,968 | A | * | 12/1971 | Noznick et al. ............ 426/570 |
| 4,088,791 | A | | 5/1978 | Jones |
| 4,183,970 | A | | 1/1980 | May et al. |
| 4,187,323 | A | * | 2/1980 | Gidlow ............... 426/250 |
| 4,368,100 | A | | 1/1983 | Pyves et al. |
| 4,438,147 | A | | 3/1984 | Hedrick, Jr. |
| 4,657,767 | A | * | 4/1987 | Meade ............... 426/471 |
| 4,734,401 | A | | 3/1988 | Blouin |
| 5,154,939 | A | | 10/1992 | Broderick et al. |
| 5,580,592 | A | | 12/1996 | Nassauer et al. |
| 6,120,820 | A | * | 9/2000 | Brody et al. ............ 426/253 |
| 6,391,361 | B1 | | 5/2002 | Peters et al. |
| 6,399,140 | B1 | | 6/2002 | Allen et al. |
| 6,468,568 | B1 | | 10/2002 | Leusner et al. |
| 6,482,433 | B1 | | 11/2002 | DeRoos et al. |
| 6,780,450 | B2 | | 8/2004 | Bodenstab |

(Continued)

FOREIGN PATENT DOCUMENTS

EP 1 477 073 11/2004

(Continued)

OTHER PUBLICATIONS

Niro Company. Production of Whey Powder from Traditional Cheese Production. Aug. 12, 2004. http://web.archive.org/web/20041208190833/www.niro.com/ndk_website/niro/cmsdoc.nsf/WebDoc/ndkw5y8ggtLibrary.*

(Continued)

*Primary Examiner* — Anthony Weier
(74) *Attorney, Agent, or Firm* — Dziezak Law Firm, P.C.

(57) ABSTRACT

The present invention relates to superior dried whey protein products which have a flavor, aroma and color not possessed by conventionally spray dried whey protein products, as a result of having a lower concentration of oxidative by-products. Also provided are dried protein products wherein the protein is selected from the group consisting of whey protein, soy protein, milk protein and mixtures thereof. Also provided are methods for making the dried protein-based products which involve spraying a protein-containing feed stock into a localized cloud of a nonreactive gas under controlled temperature conditions.

24 Claims, 2 Drawing Sheets

U.S. PATENT DOCUMENTS

| | | |
|---|---|---|
| 6,861,080 B2 | 3/2005 | Kent et al. |
| 2004/0081735 A1 | 4/2004 | Schleifenbaum et al. |

FOREIGN PATENT DOCUMENTS

| | | | |
|---|---|---|---|
| JP | 04030747 | * | 2/1992 |

OTHER PUBLICATIONS

Composition of Milk Products. http://www.cip.ukcentre.com/milk1.htm . . . taken from 1976 source.*

Office Action of Jan. 13, 2010; U.S. Appl. No. 11/358,687.
Office Action of May 1, 2009; U.S. Appl. No. 11/358,687.
U.S. Appl. No. 11/358,687, Sobel et al., filed Feb. 21, 2006.
Wisconsin Center for Dairy Research & Wisconsin Milk Marketing BD; "Dairy Proteins," pp. 1-14; no date; pub. in U.S.; www.aae.wisc.edu/future/publications/dairyproteins.pdf.

* cited by examiner

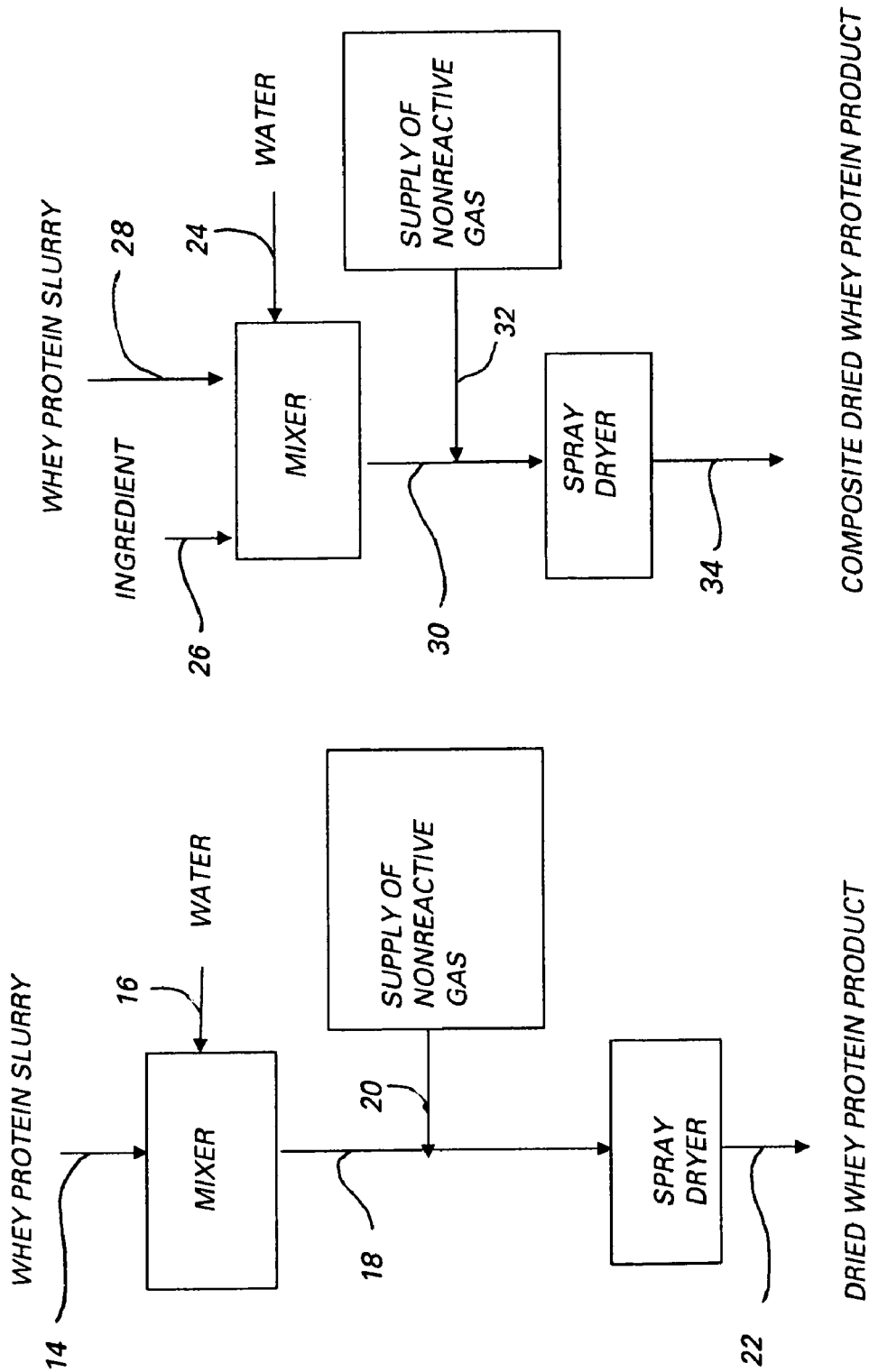

METHOD FOR MAKING DRIED WHEY PROTEIN PRODUCT

CROSS-REFERENCE TO RELATED APPLICATION

This application is a Continuation-In Part of U.S. patent application Ser. No. 11/090,973, filed on Mar. 25, 2005, now abandoned.

FIELD OF THE INVENTION

This invention relates to dried protein products and methods for making such products. More particularly, the invention relates to dried whey protein products, composite dried whey protein products, and dried protein products, and methods of making such products, which have a clean flavor profile as a result of a lower concentration of oxidative by-products than in conventionally spray dried protein products.

BACKGROUND OF THE INVENTION

Dried whey protein products have long been recognized for their nutritional benefits. A variety of dried whey protein products are known in the art, such as whey protein powder which has up to 30% protein, whey protein concentrate which has 30-85% protein, and whey protein isolate which has at least 90% protein by weight. All of such dried proteins are a valuable source of a host of nutrients, including amino acids, minerals such as calcium and potassium, phosopholipids, sphingomyelin, immunoglobulins, lactoferrin, and bioactive peptides. In addition, whey proteins boost immune function by increasing the level of glutathione, an antioxidant, in the body.

Despite these nutritional benefits, however, several undesirable organoleptic attributes of dried whey proteins often restrict their use in edible goods. For example, dried whey protein products, including freshly made products, have a strong and distinct "browned" flavor and aroma and a tan color as a result of oxidation.

Various edible goods such as nutrition bars, body-building dietary supplements, and beverage mixes, as examples, have been formulated with dried whey protein to take advantage of the ingredient's nutritional attributes. However, formulating edible goods with dried whey protein often presents a challenge in masking the ingredient's browned flavor and aroma in an effort to capture consumer appeal.

Therefore, there exists a need for a dried whey protein product that has a subdued flavor profile. There also exists a need for a method for making the aforedescribed dried protein products.

BRIEF SUMMARY OF THE INVENTION

The present invention provides novel methods for making a variety of dried protein-based products that have a clean flavor, aroma, and color relative to conventionally spray dried products. Also provided are dried protein-based products, including dried whey protein products and dried protein products wherein the protein is selected from whey protein, soy protein, milk protein, and mixtures thereof.

In a first aspect of the invention, a method for making such dried whey protein products is provided. The method comprises: (a) providing a localized cloud of a nonreactive gas; and (b) spraying droplets of a feed stock comprising whey protein into the nonreactive gas at a rate and a temperature effective to remove moisture from the droplets upon their contact with the nonreactive gas, so as to form particles of a dried whey protein product. The feed stock may also include varying concentrations of lactose and other nonprotein constituents on a dry weight basis. In one embodiment, in the providing step, the nonreactive gas is selected from the group consisting of nitrogen, carbon dioxide, argon, and mixtures thereof. In another embodiment, the method further comprises maintaining an inlet temperature in the range of from about 170° C. to about 210° C., with from about 175° C. to about 182° C. being preferred. In yet another embodiment of the present invention, the method further comprises maintaining an outlet temperature in the range of from about 70° C. to about 100° C. Preferably, the outlet temperature is maintained in the range of from about 75° C. to about 85° C.

The present invention is also directed to a dried whey protein product which has an improved flavor, produced according to the foregoing method. The improvement in organoleptic properties shown by this product is the result of a lower concentration of oxidative by-products; e.g., a reduction by as much as 40% on a relative weight basis in the furfural, dimethyl sulfide, and acetic acid contents of the product, relative to conventionally spray dried whey protein. In one embodiment, the dried whey protein product is selected from whey protein isolate, a whey protein concentrate, and whey powder.

In yet another aspect, the invention relates to an edible good comprising a dried whey protein product made according to the method of the invention described above.

In another aspect of the invention, a method is provided for making a composite dried whey protein product having at least one ingredient. The method comprises: (a) mixing a slurry of whey protein with at least one ingredient in an effective amount to form a feed stock; (b) providing a localized cloud of a nonreactive gas; and (c) spraying droplets of the feed stock into the nonreactive gas at a rate and a temperature effective to remove moisture from the droplets upon contact with the nonreactive gas, so as to form particles of a composite dried whey protein product having the at least one ingredient, wherein the composite dried whey protein product has an improved flavor. The ingredient mixed into the slurry is selected from flavorants, vitamins, minerals, dietary supplements, and mixtures thereof. In one embodiment, in the spraying step, the slurry has a protein content ranging from about 10% to about 97% on a dry weight basis.

In another embodiment, in the providing step, the nonreactive gas is selected from the group consisting of nitrogen, carbon dioxide, argon, and mixtures thereof.

In yet another embodiment, the spraying step is conducted in a drying chamber having an inlet temperature controlled in the range of from about 170° C. to about 210° C., with from about 175° C. to about 182° C. being preferred. In a further embodiment, the method further comprises maintaining an outlet temperature in the range of from about 70° C. to about 100° C. Preferably, the outlet temperature is maintained in the range of from about 75° C. to about 85° C.

The present invention is also directed to a composite dried whey protein product made in accordance with such method described above.

The invention further concerns an edible good comprising a composite dried whey protein product made according to the aforedescribed method.

In yet another aspect of the invention, a method is provided for making a dried protein product wherein the protein is selected from whey protein, soy protein, milk protein, and mixtures thereof. The method comprises spraying droplets of a feed stock comprising a protein-containing slurry into a localized cloud of nonreactive gas at a rate and a temperature effective to remove moisture from the droplets upon contact with the nonreactive gas, so as to form particles of a dried protein product. At least one ingredient may be optionally mixed into the protein slurry in an effective amount to form the feed stock. In one embodiment, in the spraying step, the feed stock has a protein content ranging from about 10% to about 97% by dry weight. In a preferred embodiment, the protein content and composition of the slurry are customized so as to yield a dried protein product having the desired protein content and composition.

In one embodiment, the nonreactive gas is selected from the group consisting of nitrogen, carbon dioxide, argon, and mixtures thereof.

In another embodiment, the spraying step is conducted in a drying chamber having an inlet temperature controlled in the range of from about 170° C. to about 210° C., with from about 175° C. to about 182° C. being preferred. In yet another embodiment of the present invention, the method further comprises maintaining an outlet temperature in the range of from about 70° C. to about 100° C. Preferably, the outlet temperature is maintained in the range of from about 75° C. to about 85° C.

In a further embodiment, in the mixing step, the ingredient is selected from the group consisting of flavorants, vitamins, minerals, dietary supplements, and mixtures thereof. The total ingredient concentration depends upon the ingredient added and the effect desired. Generally, however, the total ingredient concentration ranges from about 0.0001% to about 15% on a dry weight basis of the slurry. In yet another embodiment, the method further comprises adjusting the total solids content of the feed stock to range from about 10% to about 30% by weight, and preferably from about 20% to about 25% total solids by weight.

Another aspect of the present invention is directed to a dried protein product made according to the foregoing method, wherein the ingredient is the same as described above.

The present invention further concerns an edible good comprising a dried protein product made according to the method set forth above.

Other advantages and features of the invention will become apparent from the following description and from reference to the drawings.

BRIEF DESCRIPTION OF THE DRAWINGS

The present invention may be more easily understood by reference to the following drawings, in which:

FIG. 2 is a flow chart illustrating one embodiment of a method for making a dried whey protein product in accordance with the invention; and FIG. 3 is a flow chart illustrating one embodiment of a method for making a composite dried protein product in accordance with the invention.

DETAILED DESCRIPTION OF THE INVENTION

Figure 1:
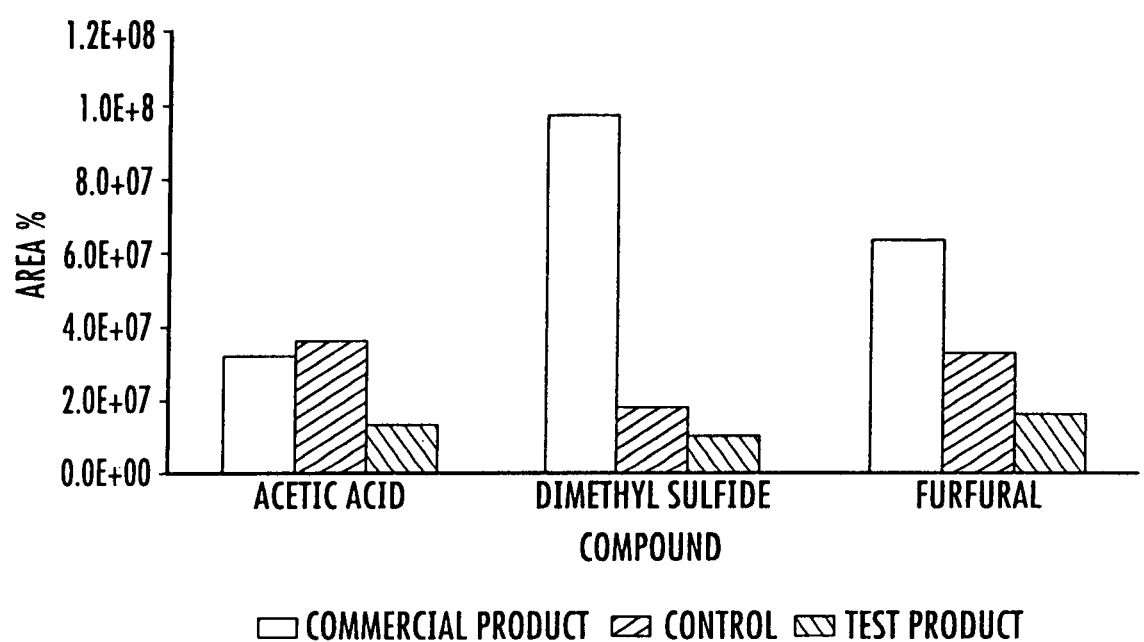
FIG. 1 is a graph showing the percentage of area of chromatographic peaks corresponding to select oxidative degradation products present in solid phase microextraction samples of whey protein isolates, produced in accordance with one embodiment of the invention and via conventional spray drying with ambient air.

This invention includes all alternatives, modifications, and equivalents that may be encompassed within the spirit and scope of the invention, as defined by the appended claims. The invention is not limited to the embodiments described herein. Throughout the following description, like numerals and letters refer to like parts or steps.

Herein, the following terms have the following meanings:

"Clean flavor" and "improved flavor" are used interchangeably to refer to a flavor that is essentially free of off-flavors associated with increased concentrations of oxidative degradation products.

"Feed stock" refers to the protein-containing medium to be spray dried, whether the medium is an aqueous slurry, a dispersion, or an emulsion.

"Milk protein" refers to a protein selected from the group consisting of caseins, caseinates, whey proteins, lactalbumin, lactoglobulins, and immunoglobulins.

"Nonreactive gas" refers to a gas which contains less than about 1 volume percent of oxygen. For purposes of this invention, such nonreactive gases are selected from the group consisting of carbon dioxide, nitrogen, argon, helium, krypton, neon, and xenon and the like, and mixtures thereof. Preferably, the nonreactive gas is selected from the group consisting of nitrogen, carbon dioxide, argon, and mixtures thereof.

"Spray drying" refers to a process of removing water from a feed stock to produce dried particles of nonaqueous materials within the feed stock. The feed stock is introduced into a chamber of a spray dryer, typically through an inlet at the top of the dryer. Inside the chamber, the feed stock is atomized into a fine mist of droplets. The droplets form particles, which are collected from an outlet port.

Conventionally, dried proteins are prepared by spray-drying a protein-containing feed stock into a spray drying chamber while feeding ambient air or compressed air into the chamber. Herein, the term "conventional spray drying" refers to a spray drying process that utilizes ambient and/or compressed air; the term "conventionally spray dried" refers to the use of such process. The air is typically fed in from the bottom but in cocurrent systems may be fed in with the feed stock at the top. Alternatively, the chamber is heated so moisture will evaporate from the droplets as they drop to the bottom of the chamber, leaving the dried protein to be collected. During the drying process, the combination of heat and oxygen in the chamber is conducive for oxidation and promotes the development of off-flavor-promoting, oxidative by-products such as acetic acid, dimethyl sulfide, and furfural.

In the present invention, the inventors have found that spraying a protein-containing feed stock into a nonreactive gas in a conventional spray drying chamber, under controlled temperature conditions and without the introduction of air or oxygen, mitigates the development of off-flavors and the discoloration that result from oxidation and thus produces a superior dried product. The inventive methods further involve localizing the gas into which the slurry is sprayed into a particular region within the chamber, such as immediately about the spray nozzle. Such localization of the nonreactive gas in a particular region in the drying chamber such as in a centralized cloud, without the introduction of air or oxygen, improves the efficiency of the inventive methods and makes the methods more economical.

In accordance with the invention, methods are provided for making (i) a dried whey protein product, (ii) a composite dried whey protein product which has at least one ingredient, and (iii) a dried protein product in which the protein is selected from whey protein, soy protein, milk protein, and mixtures thereof.

Each of the inventive methods involves spraying a protein-containing feed stock into a localized cloud of nonreactive gas in a drying chamber under controlled temperature conditions to remove water from the feed stock. The nonreactive gas suitable for use in each method of the invention is selected from the group consisting of nitrogen, carbon dioxide, argon, helium, krypton, neon, xenon, and mixtures thereof. Preferably, the nonreactive gas is selected from the group consisting of nitrogen, carbon dioxide, argon, and mixtures thereof. More preferably, the nonreactive gas is nitrogen. Each of the inventive methods is conducted without the introduction of air or oxygen.

One aspect of the invention provides for making a dried whey protein product. The method comprises: (a) providing a localized cloud of a nonreactive gas; and (b) spraying droplets of a feed stock comprising whey protein into the nonreactive gas at a rate and a temperature effective to remove moisture from the droplets upon their contact with the nonreactive gas, so as to form particles of a dried whey protein product. Another aspect of the invention centers on the dried whey protein product produced according to such method, which is described below.

Yet another aspect of the invention relates to a method for making a composite dried whey protein product. The method comprises: (a) mixing at least one ingredient in an effective amount into a protein slurry to form a feed stock; (b) providing a localized cloud of a nonreactive gas; (c) spraying droplets of the feed stock into the nonreactive gas at a rate and a temperature effective to remove moisture from the droplets upon their contact with the nonreactive gas, so as to form particles of a composite dried whey protein product having the at least one ingredient. In the mixing step, the feed stock is mixed until the ingredient is dissolved or dispersed therein. In another embodiment, a composite dried whey protein product produced according to this method is provided. Such composite dried whey protein product is described below.

In one embodiment, in the spraying step, the feed stock comprises protein in an amount ranging from about 10% to about 97% on a dry weight basis.

In the method for making the composite dried whey protein product, ingredients suitable for mixing into the protein slurry are selected from the group consisting of flavorants, vitamins, minerals, dietary supplements, and mixtures thereof. Examples of flavorants include essential oils, essences, extracts, single flavor ingredients, compounded flavors, and mixtures thereof. Any of the flavorants may be composed of natural or artificial constituents. Examples of vitamins include vitamin A, thiamin, niacin, riboflavin, C, D, E, and folic acid and the like and mixtures thereof. Examples of minerals include iron, calcium, magnesium, zinc, copper, phosphorous and potassium and mixtures thereof. Examples of dietary supplements include aloe, stevia, lecithin, lycopene, lutein, and the like and mixtures thereof. Other flavorants, vitamins, minerals, dietary supplements and other ingredients may also be used in the method.

Generally, the ingredient is added to the slurry in a total ingredient concentration ranging from about 0.0001% to about 15% on a dry weight basis. In a preferred embodiment, the effective amount of the ingredient added to the slurry depends upon the particular ingredient and the effect desired. Generally, flavorants are added at a total concentration ranging from about 0.0001% to about 5.0% on a dry weight basis. Vitamins, minerals and dietary supplements are added at a total concentration ranging from about 0.01% to about 10% on a dry weight basis. In a preferred embodiment, the flavorants are added at a total concentration ranging from about 0.1% to about 1.0% by dry weight of the feed stock; and the vitamins, minerals and dietary supplements are added at a total concentration ranging from about 2% to about 8% by dry weight.

In accordance with the invention, in both methods for making the dried whey protein product and the composite dried whey protein product, any slurry comprising whey protein is suitable for use. The slurry can be obtained from whey in any manner known to those skilled in the art and in any concentration. Lactose and mineral constituents may have been removed from the whey to the degree desired so as to yield a product having a desired protein content on a dry weight basis. The protein content of the slurry ranges from about 10% to about 97% on a dry weight basis. In a preferred embodiment, the protein content will depend upon the type of dried product desired—i.e., a whey protein isolate, a whey protein concentrate, or whey powder, for example. One example of a slurry comprising about 90% whey protein by dry weight, which is suitable for making protein isolates, is available under the trademark PROVON® from Glanbia Foods, Inc. of Monroe, Wis.

In yet another aspect, a method is provided for preparing a dried protein product which may have at least one ingredient. The protein in the product may be milk protein, whey protein, soy protein, or a mixture thereof. The method comprises: (a) optionally adding at least one ingredient in an effective amount to a slurry of protein to form a protein-containing feed stock; (b) providing a localized cloud of a nonreactive gas; and (c) spraying droplets of the protein-containing feed stock into the nonreactive gas at a rate and a temperature effective to remove moisture from the droplets upon their contact with the nonreactive gas, so as to form particles of a dried protein product. In the embodiment in which no ingredient is added to the protein slurry, the slurry is the feed stock.

In such method, any source of a protein-containing slurry may be used wherein the protein is selected from milk protein, whey protein, soy protein, or a mixture thereof, depending upon the type of protein product desired. The slurry can be obtained from suitable forms of milk, whey, or soybeans by any means known to those skilled in the art. Examples of liquid dairy ingredients suitable for use as the slurry in the present invention include whey, skim milk, reduced fat milk, whole milk, fat-enriched milk, enzyme-treated milk, ultrafiltered milk, vacuum condensed milk, diafiltered milk, liquid forms of whey wherein on a dry weight basis the nonprotein constituents have been removed to the degree desired, and mixtures thereof. Examples of liquid soy ingredients for use as the slurry in the present invention include soy extract, soy milk, reduced fat soy milk, fat-enriched soy milk, ultrafiltered soy milk, vacuum condensed soy milk, diafiltered soy milk, soy extract wherein on a dry weight basis the nonprotein constituents have been removed to the degree desired, and mixtures thereof. In one embodiment, the feed stock has a protein content ranging from about 10% to about 97% on a dry weight basis. In a preferred embodiment, the composition of the slurry is customized by varying the type of protein and the concentration of each type of protein in the slurry so that the resulting dried protein product has the composition desired. For example, in one embodiment, on a dry weight basis, the slurry may include a mixture of a treated whey and a concentrated soy extract, wherein 92% of the whey is protein and 65% of the soy extract is protein. The product made from such slurry would comprise a mixture of whey protein isolate and a soy protein concentrate.

The ingredient which may be added to the slurry is selected from the group consisting of flavorants, vitamins, minerals, dietary supplements, and mixtures thereof, as described above. Generally, the slurry has a total ingredient concentration ranging from about 0.0001% to about 15% on a dry weight basis. Preferably, the effective amount of the ingredient added to the slurry depends upon the particular ingredient and the effect desired. Flavorants are usually added at a total concentration ranging from about 0.0001% to about 5.0% on a dry weight basis. Vitamins, minerals and dietary supplements are added at a total concentration ranging from about 0.01% to about 10% on a dry weight basis. In a preferred embodiment, flavorants are added at a total concentration ranging from about 0.1% to about 1.0% by dry weight of the feed stock; and vitamins, minerals and dietary supplements are added at a total concentration ranging from about 2% to about 8% by dry weight of the feed stock.

Another aspect of the invention concerns a dried protein product produced according to this method. Such product, described below, has an improved flavor over conventionally spray dried product.

All methods of the invention may be operated in a conventional spray dryer as either a batch or continuous process. Because spray dryers are well known to those skilled in the art, a detailed disclosure of such equipment is not provided here. Examples of spray dryers and accessories, including nozzles, which may be used with the present invention include Anhydro Dryers, manufactured by The Anhydro Corp. of Olympia Fields, Ill.; Niro dryers, manufactured by Niro, Inc. of Columbia, Md.; and APV Dryers manufactured by Invensys APV of Lake Mills, Wis.

Nozzles suitable for use with all methods of the invention are selected from the group consisting of dual fluid nozzles and atomizing plates. In a preferred embodiment, the nozzle is a dual fluid nozzle. Both types of nozzles are well known in the art and may be used to centralize the cloud of nonreactive gas so it concentrates around the single orifice or the plurality of orifices of the nozzle, depending upon the particular type of nozzle used.

Any suitable pumping device may be used to pump the feed stock into the nozzle. As pumps are well known to those skilled in the art, further discussion is not provided here.

In each of the methods according to the invention, one embodiment further comprises adjusting the total solids content of the feed stock to facilitate spraying. By the addition of an effective amount of water, the total solids content is adjusted to range from about 10% to about 30% solids by weight, and preferably from about 20% to about 25% solids by weight.

In each method according to the invention, the pressure of the nonreactive gas and the temperature at the inlet of the spray dryer are controlled so as to localize the nonreactive gas around the nozzle orifice(s) and obtain a protein particle of a desired size. The nonreactive gas is introduced into the spray dryer at a pressure sufficient for atomizing the protein-containing feed stock into droplets. The nonreactive gas is typically introduced into the chamber via the nozzle but may also be introduced via the top of the tank, provided such system concentrates the stream of gas into a localized cloud into which the feed stock is sprayed. Typically, the gas pressure ranges from about 25 psi to about 120 psi. Preferably, the nonreactive gas has a pressure ranging from about 40 psi to about 80 psi.

In each method according to the invention, the inlet temperature and the outlet temperature are adjusted in conjunction with the feed rate of the feed stock to dry the particles of the product to a desired moisture content. In each method of the invention, in the spraying step, the inlet temperature is controlled in the drying chamber in a range of from about 170° C. to about 210° C. and preferably, from about 175° C. to about 182° C. An outlet temperature of from about 70° C. to about 100° C. is maintained to reduce the moisture content without scorching the particles. In a preferred embodiment, the outlet temperature is in the range from about 75° C. to about 85° C.

In each method of the invention, the product formed is dried to a moisture content ranging from 0% to about 10% by weight, preferably from about 4% to about 5%, by weight, and most preferably to a desired moisture content.

Another aspect of the invention relates to products produced by the aforedescribed methods. In accordance with one aspect of the invention, a dried whey protein product is provided which is produced according to a method comprising: (a) providing a localized cloud of a nonreactive gas; and (b) spraying droplets of a slurry comprising whey protein into the nonreactive gas at a rate and a temperature effective to remove moisture from the droplets upon their contact with the nonreactive gas, so as to form particles of a dried whey protein product.

Also provided in accordance with the invention is a composite dried whey protein product which has at least one ingredient and an improved flavor over a conventionally spray dried whey protein product. The product is produced according to a method comprising: (a) mixing a slurry of whey protein with at least one ingredient in an effective amount to form a feed stock; (b) providing a localized cloud of a nonreactive gas; and (c) spraying droplets of the feed stock into the nonreactive gas at a rate and a temperature effective to remove moisture from the droplets upon contact with the nonreactive gas, so as to form particles of the composite dried whey protein product comprising the ingredient.

Both such inventive products have remarkably less off-flavor and a notably lighter color than conventionally spray-dried whey protein as a result of having a lower concentration of oxidative degradation products. For example, during conventional spray drying, non-enzymatic Maillard reactions yield acetic acid and furfural, and the release and/or cleavage of disulfide bonds within whey proteins—typically during dehydration processes and protein denaturation—generates dimethyl sulfide. Although the dried whey protein product and the composite dried whey protein product of this invention contain acetic acid, dimethyl sulfide and furfural, these oxidative by-products are each present at less than 40% the level typically found in corresponding forms of conventionally spray dried whey protein products. The lower concentrations of the oxidative by-products in the dried whey protein product and the composite dried whey protein product of this invention correlate with an improved flavor and aroma in these products. The improved flavor of both product embodiments obviates the need for food processors to mask the undesirable flavor notes that typically characterize dried whey proteins, thus making the inventive products more appealing for use in edible goods.

Both the dried whey protein product and the composite dried whey protein product may be of any form of whey protein—i.e., a whey protein isolate, a whey protein concentrate, or a whey powder, as examples, depending upon the protein content in the feed stock, on a dry weight basis. The protein content of both product embodiments of the invention is a function of the concentration of protein in the feed stock and the extent to which lactose and mineral constituents have been removed prior to use of the feed stock in the methods of this invention. Both product embodiments have a protein content ranging from about 10% to about 97%, by dry weight. However, in a preferred embodiment, the protein content is customized as desired upon the selection of a suitable slurry.

In the composite dried protein product, the ingredient, described above, is selected from the group consisting of flavorants, vitamins, minerals, dietary supplements, and mixtures thereof. In the product, the total ingredient concentration ranges from about 0.0001% to about 15% on a dry weight basis. In a preferred embodiment, the concentration of the ingredient depends upon the particular ingredient and the effect desired. On a dry weight basis, flavorants have a total concentration ranging from about 0.0001% to about 5% of the product, with about 0.1% to about 1.0% being preferred. On a dry weight basis, vitamins, minerals and dietary supplements have a total concentration ranging from about 0.01% to about 10% of the product, with from about 2% to about 8% being preferred.

The composite dried whey protein advantageously provides a source of a desired ingredient to any end product into which it is formulated. For example, a composite dried whey protein product having a vanilla flavor and cinnamon oil would impart a vanilla-cinnamon note to, for example, breakfast drinks or cereal bars that are formulated with the protein product.

In yet another aspect of the invention is a dried protein product, which may optionally comprise at least one ingredient. The protein, described above, is selected from whey protein, soy protein, milk protein, and mixtures thereof. Such product is made according to the method comprising: (a) optionally mixing at least one ingredient in an effective amount into a protein-containing slurry to form a feed stock; (b) providing a localized cloud of a nonreactive gas; and (c) spraying droplets of the feed stock into the nonreactive gas at a rate and a temperature effective to remove moisture from the droplets upon contact with the nonreactive gas, so as to form particles of a dried protein product having the optionally mixed-in ingredient. Such dried protein products are expected to have less off-flavor and a notably lighter color than conventionally spray dried proteins of the same compositions.

The composition of the dried protein product may be customized by selecting a slurry having the desired type of protein at the desired concentration. Each type of protein may be present in the dried protein product in any suitable form known in the art available for that type of protein. For example, soy protein may be present in the form of a soy protein isolate, a soy protein concentrate, or a soy powder. Whey protein may be present in the form of a whey protein isolate, whey protein concentrate, or a whey powder. Milk protein may be present in the form of casein, caseinate, beta-lactoglobulin, alpha-lactalbumin, immunoglobulins, milk protein concentrate, dried milk from which fat has been removed to varying contents, and mixtures thereof. For example, in one embodiment, the dried protein product may be a soy protein isolate. In another embodiment, the dried protein product may comprise a mixture of whey protein isolates and soy protein concentrates, as an example.

The ingredient which may be optionally incorporated into the dried protein product is the same as that discussed above. The ingredient is selected from the group consisting of flavorants, vitamins, minerals, dietary supplements, and mixtures thereof, each of which is described above. On a dry weight basis, the concentration of the ingredient in the product will depend upon the particular ingredient added and the effect desired; generally, however, on a dry weight basis, the total ingredient concentration ranges from about 0.0001% to about 15%. On a dry weight basis, flavorants range from about 0.0001% to about 5.0%, and preferably from about 0.1% to about 1.0%. On a dry weight basis, vitamins, minerals and dietary supplements range from about 0.01% to about 10% and preferably from about 2% to about 8%.

All products according to the invention have a protein content ranging from about 10% to about 97% on a dry weight basis. In accordance with the invention, all products have from 0% to about 10% moisture by weight, with about 4% to about 5% moisture, by weight, being preferred. Most preferably, the products of the invention are dried to a desired moisture content.

In another aspect of the invention, an edible good is provided which comprises an effective amount of any of the dried products of the invention—i.e., a dried whey protein, a composite dried whey protein, or a dried protein product. Edible goods that may be formulated with any product of this invention include, by way of nonlimiting examples, animal feed, beverages, beverage mixes, coffee creamers, dairy desserts, yogurts, infant foods, nutritional products such drink mixes and sports bars, body-building supplement products, enteral products, weight-loss products, and pharmaceutical products.

Each of the products of the invention also has application in cosmetics, such as foundations and creams.

Example 1

The following illustrates a method for making a dried whey protein product in accordance with the invention.

| Ingredient | Amount | Weight % |
| --- | --- | --- |
| Whey Protein Slurry, (Provon ®) | 214.0 | 21.4 |
| Water | 786.0 | 78.6 |

A whey protein slurry comprising more than 90% protein and lecithin (Provon®) was obtained from Glanbia Foods, Inc. of Monroe, Wis., to make both a test product and a control. The slurry was kept frozen for about two weeks before it was used. A commercially available dried whey protein isolate (Provon® 290)—an agglomerated form of the whey protein slurry—was also obtained from Glanbia Foods, Inc. The dried isolate, comprising more than 90% protein and lecithin, was analyzed to provide an additional bench mark in the analysis of the test product and control.

Shown in FIG. 2 is a flow chart, illustrating the embodiment of the method used in this example. The protein slurry, shown as stream 14, was fed into a mixer, where it was blended with purified water, shown as stream 16, in a 1:3 ratio of slurry-to-water to adjust the total solids content to not more than about 22% for facilitating spraying into a drying chamber. In this example, a pilot plant spray dryer (obtained from APV Nordic Anydro of Tonawanda, N.Y.) was used and was fitted with a dual fluid spray nozzle ("1/4 JBC SS") from Spraying Systems, Inc. of Wheaton, Ill.

The diluted slurry (stream 18) formed in the mixer was fed via a peristaltic pump into the nozzle at 2-5 ml/sec, along with nitrogen gas (5.0 Ultra-High Purity Grade obtained from Praxair of Hillside, Ill.) at 60 psi, shown as stream 20. As the gas was expelled from the nozzle, the gas formed a localized cloud around the orifice of the nozzle. The diluted protein slurry was sprayed as droplets into the cloud of nonreactive gas. The inlet temperature was maintained at about 204° C., and the outlet temperature at about 85° C. As a result of controlling the feed rate of the diluted slurry, the temperature at the inlet, and the pressure of the nonreactive gas, moisture evaporated from the droplets in the presence of the gas, leaving particles of dried whey protein which descended to the bottom of the drying chamber. The dried whey protein product is shown as stream 22. Test product was collected for further analysis. A control was prepared from the same diluted slurry and processing conditions, except that compressed air was used in place of nitrogen gas.

Solid phase microextraction was employed to assess the presence and relative concentration of oxidative degradation products which developed in the test product, the control, and the commercially spray dried whey protein isolate. Analytes included acetic acid, dimethyl sulfide, and furfural. The analytes were extracted onto a polydimethylsiloxane fiber (solid phase microextraction fiber type 100 microns, available from Supelco, Inc., located in Bellafonte, Pa.), which was then placed within the headspace of a gas chromatograph fitted with a mass selective detector for analysis.

FIG. 1 is a graph of the relative percentages of area beneath peaks in the chromatogram which correspond to acetic acid, dimethyl sulfide, and furfural. The results show that the test product sustained less degradation than the control. Compared with the control, the test product had about 63% less acetic acid, about 47% less dimethyl sulfide, and about 50% less furfural.

Compared with the commercially spray dried whey protein isolate, the test product also had markedly lower concentrations of oxidative degradation products; i.e., about 58% less acetic acid, about 89% less dimethyl sulfide, and about 75% less furfural.

Ten trained panelists conducted a triangle test to validate that the test product and control were sufficiently different and distinguishable from each other in flavor. Both products were evaluated at a 5% concentration in a 10% sucrose-sweetened solution, by weight. Ten out of 10 panelists correctly identified the test product.

The test product and control were also examined visually for color differences. The control had a tanned appearance, whereas the test product had a significantly lighter appearance. Eighteen of 20 trained panelists correctly distinguished the nitrogen-processed test product from the control.

Example 2

The following illustrates a method in accordance with the invention for producing a composite dried whey protein product having a flavorant. Shown in FIG. 3 is a flow chart of the embodiment used in this example.

| Ingredient | Amount (g) | Weight % |
| --- | --- | --- |
| Whey Protein Slurry, (Provon ®) | 354,254.737 | 21.4000 |
| Water | 97,068.768 | 78.0998 |
| Vanilla Flavor, Nat. WONF, 19036BWC1 | 0.907 | 0.0002 |
| Sweetness-enhancing flavor, 5424AWC1 | 1133.981 | 0.2500 |
| Natural flavor for mouth feel, 12535CEM1 | 1133.981 | 0.2500 |

As depicted in FIG. 3, a feed stock was formed by dissolving the three flavors (from Flavors of North America, Inc.) in water, shown by stream 24. The flavors are collectively shown as ingredient stream 26. Shown as stream 28, a protein slurry comprising more than 90% whey protein (Provon® from Glanbia Foods, Inc.) was thawed and added to the water in the mixer, where it was gently mixed until completely melted.

The feed stock, stream 30, was then immediately fed via a peristaltic pump into a dual fluid nozzle secured to a pilot plant-scale spray dryer—the same equipment described in Example 1 above. Shown as stream 32, compressed nitrogen gas was fed at 60 psi into the nozzle to atomize the feed stock into the drying chamber.

In the drying chamber, the inlet temperature was set at 204° C., and the outlet temperature at 85° C. Test product, shown as stream 34, was collected. The same formulation and processing conditions were used to prepare a control, except that compressed air was substituted for the compressed nitrogen gas.

The test product and control were evaluated for flavor differences in a triangle test. The products were tasted at a 5% concentration in a 10% sucrose-sweetened solution, by weight. Ten out of 10 trained panelists correctly distinguished the test product from the control.

The nitrogen-processed whey protein and the control were also found to be readily distinguishable from each by visual examination for color. The test product was notably lighter in appearance than the tan-colored control. These differences were noted by 18 of 20 trained panelists in a triangle test.

The present invention may be embodied in other forms without departing from its spirit or essential characteristics. Although specific embodiments are shown by way of example, these embodiments are to be considered in all respects as only illustrative and not restrictive as to the scope of the invention. Rather, the invention covers all modifications, equivalents and alternatives that fall within the scope of the invention, as defined by the following appended claims.

We claim:

1. A method of preparing a dried whey protein product comprising:
   (a) mixing a feed stock comprising whey protein,
   (b) providing a cloud of a nonreactive gas at a pressure ranging from about 25 psi to about 120 psi, wherein the gas is localized about a spray nozzle, and
   (c) without the introduction of air or oxygen, spraying droplets of the feed stock from said spray nozzle into the cloud of nonreactive gas at a rate and a temperature effective to remove moisture from the droplets upon their contact with the nonreactive gas, immediately about the spray nozzle so as to form particles of a dried whey protein product wherein processing conditions employed substantially reduce the amount of oxidative degradation products furfural, dimethyl sulfide, and acetic acid formed and wherein a product is provided with a flavor that is essentially free of off-flavors while also mitigating discoloration that would otherwise occur in the presence of such oxidative degradation products.

2. The method of claim 1, wherein the nonreactive gas is selected from the group consisting of nitrogen, carbon dioxide, argon, and mixtures thereof.

3. The method of claim 1 further comprising maintaining an inlet temperature in the range of from about 170° C. to about 210° C.

4. The method of claim 3, wherein the inlet temperature is maintained in the range of from about 175° C. to about 182° C.

5. The method of claim 1, further comprising maintaining an outlet temperature in the range of from about 70° C. to about 100° C.

6. The method of claim 5, wherein the outlet temperature is maintained in the range of from about 75° C. to about 85° C.

7. The method of claim 1, wherein the feed stock has a protein content ranging from about 10% to about 97% on a dry weight basis.

8. The method of claim 1, wherein step (a) further comprises adjusting the total solids content of the feed stock to range from about 10% to about 30% solids by weight when sprayed.

9. The method of claim 1, wherein the feed stock is formed by mixing a slurry of the whey protein with at least one ingredient in an effective amount, such that in the spraying step, the dried whey protein product formed comprises the ingredient.

10. The method of claim 9, wherein in the mixing step, the at least one ingredient is selected from the group consisting of flavorants, vitamins, minerals, dietary supplements and mixtures thereof.

11. The method of claim 10, wherein the flavorants comprise at least one material selected from the group consisting of essential oils, essences, extracts, single flavor ingredients, compounded flavors, and mixtures thereof.

12. A method for making a dried protein product, comprising:
   (a) providing a cloud of a nonreactive gas localized about a spray nozzle in a particular region within the drying chamber and having a pressure ranging from about 25 to about 120 psi, and
   (b) from the spray nozzle and without the introduction of air or spraying droplets of a feed stock comprising a protein-containing slurry into the cloud of nonreactive gas at a rate and a temperature effective to remove moisture from the droplets upon contact with the nonreactive gas, immediately about the spray nozzle so as to form particles of a dried protein product,
   wherein processing conditions employed substantially reduce the amount of oxidative product furfural, dimethyl sulfide, and acetic acid formed and wherein a product is provided with a flavor that is essentially free of off-flavors while also mitigating discoloration that would otherwise occur in the presence of such oxidative degradation products.

13. The method of claim 12, wherein the feed stock is formed by mixing at least one ingredient in an effective amount into the protein-containing slurry.

14. The method of claim 12, wherein in the spraying step, the protein in the slurry is selected from the group consisting of whey protein, soy protein, milk protein, and mixtures thereof.

15. The method of claim 12, wherein the nonreactive gas is selected from the group consisting of nitrogen, carbon dioxide, argon, and mixtures thereof.

16. The method of claim 12, wherein the spraying step is conducted in a drying chamber having an inlet temperature controlled in the range of from about 170° C. to about 210° C.

17. The method of claim 12, wherein the spraying step is conducted in a drying chamber having an outlet temperature controlled in the range of from about 70° C. to about 100° C.

18. The method of claim 13, wherein in the mixing step, the at least one ingredient is selected from the group consisting of flavorants, vitamins, minerals, dietary supplements, and mixtures thereof.

19. The method of claim 18, wherein the flavorants include at least one material selected from the group consisting of essential oils, essences, extracts, single flavor ingredients, compounded flavors, and mixtures thereof.

20. The method of claim 12, wherein step (b) further comprises adjusting the total solids content of the feed stock to be sprayed to range from about 10% to about 30% by weight.

21. The method of claim 12, wherein the feed stock has a protein content ranging from about 10% to about 97% by dry weight.

22. The method of claim 1 wherein the protein product formed in the spraying step is one of whey protein isolates, whey protein concentrates, and whey protein powder.

23. The method of claim 12 wherein in step (b), the gas is localized about the spray nozzle.

24. The method of claim 1 wherein in the spraying step, the nonreactive gas has a pressure ranging from about 40 psi to about 80 psi.

* * * * *

UNITED STATES PATENT AND TRADEMARK OFFICE
CERTIFICATE OF CORRECTION

| | |
|---|---|
| PATENT NO. | : 8,003,147 B1 |
| APPLICATION NO. | : 11/377621 |
| DATED | : August 23, 2011 |
| INVENTOR(S) | : Robert A. Nelson and Robert M. Sobel |

It is certified that error appears in the above-identified patent and that said Letters Patent is hereby corrected as shown below:

Column 1
    line 30, replace "phosopholipids" with --phospholipids--.

Column 10
    line 49, replace "APV Nordic Anydro" with --APV Nordic Anhydro--.

Column 13
    line 15, in part (a) of claim 12, replace "in a particular region within the drying" with --in a particular region within a drying--; and line 19, in part (b) of claim 12, replace "air or spraying" with --air or oxygen, spraying--.

Signed and Sealed this
Twentieth Day of December, 2011

David J. Kappos
*Director of the United States Patent and Trademark Office*